(12) United States Patent
Horesh et al.

(10) Patent No.: US 11,049,035 B2
(45) Date of Patent: Jun. 29, 2021

(54) META-LEVEL SHORT-DEPTH QUANTUM COMPUTATION OF K-EIGENPAIRS

(71) Applicant: International Business Machines Corporation, Armonk, NY (US)

(72) Inventors: Lior Horesh, North Salem, NY (US); Giacomo Nannicini, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 523 days.

(21) Appl. No.: 15/983,916

(22) Filed: May 18, 2018

(65) Prior Publication Data

US 2019/0354897 A1 Nov. 21, 2019

(51) Int. Cl.
*G06N 10/00* (2019.01)
*G06F 17/16* (2006.01)
*G06N 7/00* (2006.01)

(52) U.S. Cl.
CPC ............. *G06N 10/00* (2019.01); *G06F 17/16* (2013.01); *G06N 7/00* (2013.01)

(58) Field of Classification Search
CPC .......... G06N 10/00; G06N 7/00; G06N 20/00; G06F 17/16
USPC ............................................. 706/50, 52, 56
See application file for complete search history.

(56) References Cited

U.S. PATENT DOCUMENTS

| | | | |
|---|---|---|---|
| 8,165,818 B2 | 4/2012 | Nicholls | |
| 9,614,668 B1* | 4/2017 | Simmons | H04L 9/0852 |
| 9,800,411 B1* | 10/2017 | Brown | H04L 9/3066 |
| 9,942,039 B1* | 4/2018 | Gutoski | G06F 7/72 |
| 10,031,795 B1* | 7/2018 | Eaton | H04L 9/304 |
| 10,061,636 B1* | 8/2018 | Eaton | G06F 21/72 |
| 10,325,218 B1* | 6/2019 | Zeng | G01R 31/3177 |
| 2006/0224547 A1 | 10/2006 | Ulyanov et al. | |
| 2014/0164313 A1 | 6/2014 | Alboszta et al. | |

(Continued)

OTHER PUBLICATIONS

Peruzzo, et al., "A variational eigenvalue solver on a photonic quantum processor," Nature Communications | 5:4213 | DOI: 10.1038/ncomms5213 |www.nature.com/naturecommunications, 7 pages.

(Continued)

*Primary Examiner* — Michael T Tran
(74) *Attorney, Agent, or Firm* — Amin, Turocy & Watson, LLP

(57) ABSTRACT

Techniques and a system to facilitate meta-level quantum computation are provided. In one example, a system includes a quantum processor and a classical processor. The quantum processor can perform an expectation computation process to compute an expected value of a deflated operator and a quantum state associated with a quantum circuit description. The classical processor can execute computer executable components stored in a memory, where the computer executable components comprise a meta-level variational optimization component. The meta-level variational optimization component can perform a meta-level optimization process associated with a k-eigenvalue decomposition process to iteratively determine an inflation parameter and a variational parameterization for an eigenpair based on samples of the expectation computation process.

20 Claims, 8 Drawing Sheets

(56) References Cited

U.S. PATENT DOCUMENTS

| | | | |
|---|---|---|---|
| 2014/0187427 A1* | 7/2014 | Macready | G06N 5/02 505/170 |
| 2015/0088783 A1 | 3/2015 | Mun | |
| 2017/0331623 A1* | 11/2017 | Fu | G06F 21/602 |
| 2018/0336299 A1* | 11/2018 | Barzegar | G06F 30/20 |
| 2020/0117702 A1* | 4/2020 | Babbush | G06N 10/00 |
| 2020/0410343 A1* | 12/2020 | Niu | G06N 3/08 |
| 2020/0410381 A1* | 12/2020 | Khan | G06F 17/16 |
| 2020/0410382 A1* | 12/2020 | Babbush | H03K 19/173 |
| 2020/0410384 A1* | 12/2020 | Aspuru-Guzik | G06N 7/08 |

OTHER PUBLICATIONS

Garnerone, et al., "Adiabatic Quantum Algorithm for Search Engine Ranking," Physical Review Letters, 2012, American Physical Society, 6 pages.

Berry, "High-order quantum algorithm for solving linear differential equations," arXiv:1010.2745v2 [quant-ph] Jan. 28, 2014, 14 pages.

Neven, et al., "Image recognition with an adiabatic quantum computer I. Mapping to quadratic unconstrained binary optimization," Apr. 28, 2008, 7 pages.

Toulouse, et al., "Introduction to the variational and diffusion Monte Carlo methods," arXiv:1508.02989v1 [physics.chem-ph] Aug. 12, 2015, 26 pages.

Weinstein, "Modified Ritz Method," Norman Bridge Laboratory of Physics, California Institute of Technology, Communicated Jul. 30, 1934, 4 pages.

MacDonald, "On the Modified Ritz Variation Method," Phys. Rev., 1934, 1 page.

Harrow, et al., "Quantum algorithm for linear systems of equations," arXiv:0811.3171v3 [quant-ph] Sep. 30, 2009, 15 pages.

Nielsen, et al., "Quantum Computation and Quantum Information," www.cambridge.org/9781107002173, First published 2000, 698 pages.

Kitaev, "Quantum Measurements and the Abelian Stabilizer Problem," ECCC, Dec. 4, 1995, 22 pages.

Costa, et al., "RBFOpt: an open-source library for black-box optimization with costly function evaluations," Last Accessed: Mar. 27, 2018, 34 pages.

Griffiths, et al., "Semiclassical Fourier Transform for Quantum Computation," arXiv:quant-ph/9511007v1 Nov. 7, 1995, 7 pages.

McClean, et al., "The theory of variational hybrid quantum-classical algorithms," New J. Phys. 18 (2016) 023023, 23 pages.

* cited by examiner $$500 \begin{bmatrix} 1 & 0 & 0 & 0 & 0 & 0 & 0 & 1 \\ 0 & 0 & 0 & -2 & -2 & 0 & 0 & 1 \\ 0 & 0 & 1 & 0 & 0 & 1 & 0 & 0 \\ 0 & -2 & 0 & 0 & 0 & 0 & -2 & 0 \\ 0 & -2 & 0 & 0 & 0 & 0 & -2 & 0 \\ 0 & 0 & 1 & 0 & 0 & 1 & 0 & 0 \\ 0 & 0 & 0 & -2 & -2 & 0 & 0 & 0 \\ 1 & 0 & 0 & 0 & 0 & 0 & 0 & 1 \end{bmatrix}$$

FIG. 5

META-LEVEL SHORT-DEPTH QUANTUM COMPUTATION OF K-EIGENPAIRS

BACKGROUND

The subject disclosure relates generally to quantum computing. Quantum computing employs quantum physics principles to encode and manipulate information rather than relying upon classical models of computation. For example, a quantum circuit can employ quantum bits (e.g., qubits) that may be put in a superposition and/or entanglement state, based upon principles of quantum physic. The superposition principle of quantum physics allows each qubit to represent both a value of "1" and a value of "0" at the same time (along with complex valued phase). The entanglement principle of quantum physics states allows qubits to be correlated with each other in a way that has no parallel in classical computation. For instance, a state of a first value (e.g., a value of "1" or a value of "0") can depend on a state of a second value. As such, a quantum circuit can employ qubits and quantum gates to encode information rather than binary digital techniques based classical binary bits and classical gates. A key differentiating aspect of quantum from classical computation, is that the state of an n qubit system, may require 2n complex values for its representation, as opposed to n binary numbers for an n classical bits register. This exponential difference in the state space dimension, can be instrumental in acceleration of computation. However, design of a quantum circuit that leverages this advantage is generally difficult and/or time consuming as compared to conventional binary digital devices. State-of-the-art quantum devices, are not fault tolerant, which impose limitations upon the design of quantum algorithms. In one example, McClean et al., "The theory of variational hybrid quantum-classical algorithms", discloses "a variational adiabatic ansatz and explore unitary coupled cluster where we establish a connection from second order unitary coupled cluster to universal gate sets through a relaxation of exponential operator splitting. We introduce the concept of quantum variational error suppression that allows some errors to be suppressed naturally in this algorithm on a pre-threshold quantum device. Additionally, we analyze truncation and correlated sampling in Hamiltonian averaging as ways to reduce the cost of this procedure." However, design of a quantum circuit can be improved and/or quantum computing processing can be improved.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products for facilitating quantum circuit decomposition by integer programming are described.

According to an embodiment, a system can comprise a quantum processor and a classical processor. The quantum processor can perform an expectation computation process to compute an expected value of a deflated operator and a quantum state associated with a quantum circuit description. The classical processor can execute computer executable components stored in a memory, wherein the computer executable components comprise: a meta-level variational optimization component. The meta-level variational optimization component can perform a meta-level optimization process associated with a k-eigenvalue decomposition process to iteratively determine an inflation parameter and a variational parameterization for an eigenpair based on samples of the expectation computation process. In certain embodiments, the meta-level variational optimization component can transmit the quantum circuit description to the quantum processor, and the quantum circuit description can include a trial deflated operator and a trial state variational parameterization. In an embodiment, the quantum processor can perform the expectation computation process to generate quantum measurement data indicative of a set of quantum measurements. In certain embodiments, the computer executable components further comprise: an expectation computation component that computes an expectation of the quantum measurement data. In an embodiment, the meta-level variational optimization component can utilize output from the expectation of the quantum measurement data to iteratively determine an eigenvalue and an eigenstate. In another embodiment, the meta-level optimization process performed by the meta-level variational optimization component can employ information from previously determined eigenvalues to determine eigenvalues higher than the previously determined eigenvalues. In yet another embodiment, the expectation computation component can format the quantum measurement data based on a modulo summation process. In certain embodiments, the meta-level variational optimization component can transmit the quantum circuit description to the quantum processor, and wherein the quantum circuit description includes an operator represented as a weighted sum of tensor products of Pauli and identity operators. In certain embodiments, the meta-level variational optimization component can perform the meta-level optimization process to facilitate reduced error associated with the quantum processor.

According to another embodiment, a computer-implemented method is provided. The computer-implemented method can comprise receiving, by a system operatively coupled to a processor, samples of an expectation computation process performed by a quantum processor to compute an expected value of a deflated operator and a quantum state associated with a quantum circuit description. The computer-implemented method can also comprise performing, by the system, a meta-level optimization process associated with a k-eigenvalue decomposition process to iteratively determine an inflation parameter and a variational parameterization for an eigenpair based on samples of the expectation computation process. In certain embodiments, the computer-implemented method can also comprise transmitting, by the system, the quantum circuit description to the quantum processor, wherein the quantum circuit description includes a trial deflated operator and a trial state variational parameterization. In an embodiment, the performing the meta-level optimization process can comprise performing the expectation computation process to generate quantum measurement data indicative of a set of quantum measurement. In certain embodiments, the computer-implemented method can also comprise computing, by the system, an expectation of the quantum measurement data. In certain embodiments, the computer-implemented method can also comprise utilizing, by the system, output from the expectation of the quantum measurement data to iteratively determine an eigenvalue and an eigenstate. In an embodiment, the performing the meta-level optimization process can comprise reducing error associated with the quantum processor.

According to yet another embodiment, a computer program product for meta-level quantum computation can comprise a computer readable storage medium having program instructions embodied therewith. The program instructions can be executable by a processor and cause the processor to receive, by the processor, samples of an expectation computation process performed by a quantum processor to compute an expected value of a deflated operator and a quantum state associated with a quantum circuit description. The program instructions can also cause the processor to perform, by the processor, a meta-level optimization process associated with a k-eigenvalue decomposition process to iteratively determine an inflation parameter and a variational parameterization for an eigenpair based on samples of the expectation computation process. In certain embodiments, the program instructions can also cause the processor to transmit, by the processor, the quantum circuit description to the quantum processor, wherein the quantum circuit description includes a trial deflated operator and a trial state variational parameterization. In certain embodiments, the program instructions can also cause the processor to perform, by the processor, the expectation computation process to generate quantum measurement data indicative of a set of quantum measurement. In certain embodiments, the program instructions can also cause the processor to compute, by the system, an expectation of the quantum measurement data. In certain embodiments, the program instructions can also cause the processor to format, by the processor, the quantum measurement data based on a modulo summation process.

DESCRIPTION OF THE DRAWINGS

FIG. 5 illustrates example, non-limiting data in accordance with one or more embodiments described herein.

DETAILED DESCRIPTION

Figure 1:
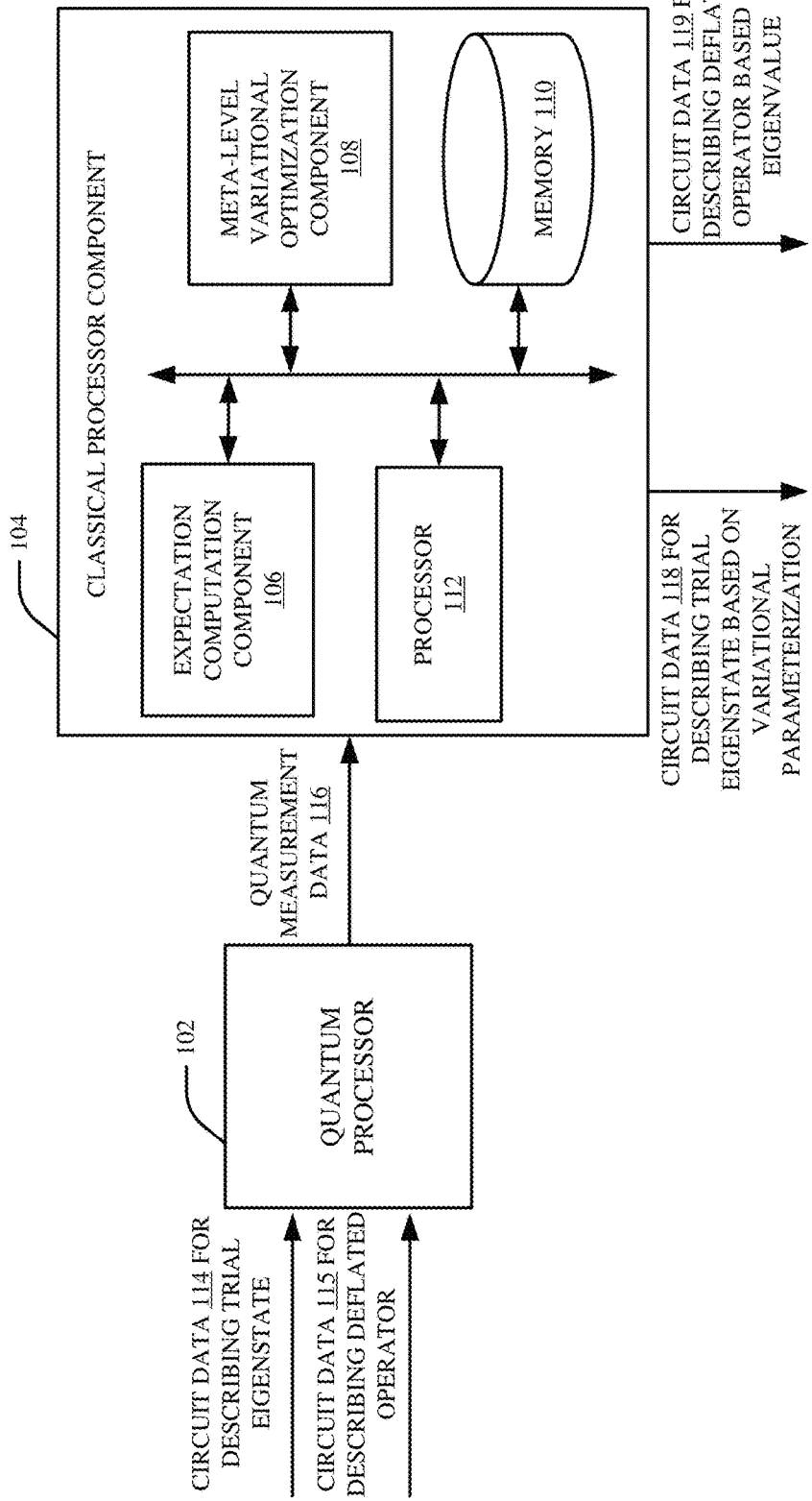
FIG. 1 illustrates a block diagram of an example, non-limiting system that includes a quantum processor and a classical processor component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing employs quantum physics to encode information rather than binary digital techniques based on transistors. For example, a quantum circuit can employ quantum bits (e.g., qubits) that operate according to a superposition principle of quantum physics and an entanglement principle of quantum physics. The superposition principle of quantum physics allows each qubit to represent both a value of "1" and a value of "0" at the same time. The entanglement principle of quantum physics states allows qubits in a superposition to be correlated with each other. For instance, a state of a first value (e.g., a value of "1" or a value of "0") can depend on a state of a second value. As such, a quantum circuit can employ qubits to encode information rather than binary digital techniques based on transistors. However, design of a quantum circuit is generally difficult and/or time consuming as compared to conventional binary digital devices. Furthermore, it is generally desirable to increase efficiency of a quantum circuit and/or a quantum computing process. As such, design of a quantum circuit and/or quantum computing processing can be improved.

To address these and/or other issues, embodiments described herein include systems, computer-implemented methods, and computer program products for meta-level quantum computation. In an aspect, meta-level quantum computation of k-eigenvalue decomposition can be provided. In another aspect, hybrid quantum and classical computation of k-eigenpairs can be provided. The k-eigenvalue decomposition can include processing a data matrix associated with quantum processing to determine a particular eigenvalue of the data matrix with a certain number of qubits. In another aspect, a set of shallow depth quantum calculations can be performed in a hybrid classical computing/quantum computing environment. The set of shallow depth calculations can be, for example, calculations with a lower number of gate operations than a deep depth calculation. In another embodiment, a quantum processor can sample data associated with a quantum system based on a k-eigenvalue decomposition process to generate quantum measurement data. The quantum measurement data can be indicative of a set of quantum measurements associated with the data. Furthermore, a classical processor can generate statistical data indicative of an expected value associated with the quantum measurement data. The classical processor can also determine a quantum state associated with the data based on the statistical data. In an aspect, the classical processor can receive quantum measurement data from the quantum processor that can process an expectation computation. The quantum processor can also generate the quantum measurement data for a variational parametrization of a state prescription based on a k-eigenvalue decomposition process. In yet another embodiment, the quantum processor can perform a quantum computation in a large (e.g., $2^n$) Hilbert space. Outcomes of the quantum computation can be sampled upon n qubits. In particular, the quantum processor can perform expectation computation of an Hermitian operator with respect to a given state. In an aspect, a quantum computing execution can yield a product of an operator by a state vector and its measurement in a desired basis. The quantum expectation computation can, for example, be embedded within a classical optimization framework to perform a k-eigenvalue decomposition process. In certain embodiments, the quantum processor can receive an operator and a state description formatted as a sequence of quantum gates describing a state preparation, application of the operator upon the state, and/or a quantum measurement procedure.

In an embodiment, computation of k-eigenpairs can be performed sequentially via a meta level search process. The meta level search process can determine a variational parameterization that describes state preparation, where a prepared state can satisfy an eigen-decomposition condition. For example, an application of an operator upon the state can provide the state multiplied by a scaling factor. The scaling factor can be, for example, an eigen value. In an aspect, the classical processor can simultaneously determine both a state preparation parameterization circuit as well as a respective eigenvalue. To ensure that eigenpairs are found in an orderly fashion (e.g., from smallest to largest), an optimization process can incorporate a penalty function which can increase monotonically with an eigenvalue. As such, among various eigenpairs (e.g., various eigenvalue pairs that satisfy an eigen-decomposition condition), the quantum processor can detect a smallest valued eigenpair. On consequent meta-level eigen pair search iterations, rediscovery of previously found eigenpairs can be avoided by introducing a constraint that requires that an eigen-value found is larger than previously found eigenvalues. In an aspect, within an optimization cycle, the quantum processor can perform variational parameterization and/or assessment of an eigenvalue. The quantum computer can, for example, receive a state preparation procedure, an operator and/or an eigen value. The quantum computer can also compute a deflated (e.g., operator minus an eigenvalue multiplied by an identity operator), penalized expectation. A quantum bit-string measurement can be provided to the classical processor which can compute an expectation over multiple quantum experiments of respective proposed setups. In certain embodiments, to reduce circuit depth at respective expectation computations, an operator can be provided to a quantum computation as a sum of tensor products of elementary quantum gates. Since quantum computation and measurement are linear, expectation of a sum can equate to sum of expectations. Thus, the expectation computation can be divided into multiple circuit depth computations with shorter length. A circuit depth computation can accommodate preparation of a state and a product of the state by a component of a decomposed operator. In certain embodiments, for a choice of an operator comprising a weighted sum of Pauli and identity tensor products, respective components can include a single tensor product or plural tensor products (e.g., plural tensor products smaller than a total number of terms), based upon a fidelity of the quantum processor and/or a set of precision requirements.

In another embodiment, meta-level quantum computation of k-eigenvalue decomposition can be performed. In an aspect, a minimal eigenpair can be found using quantum variational expectation estimation. In another aspect, a quantum state can be represented parametrically. In one example, an operator to be decomposed can be represented as a sum of tensor products (e.g., comprising Pauli operators and identities). In yet another aspect, an expectation computation by application of the operator to the state and a corresponding projection to a local measurement basis can be performed. In certain embodiments, a search (e.g., a classical computation search) can be conducted for a set of parameters that form a state that minimizes an expected value of the operator. In an aspect, an outcome can be a parametric representation of a minimal state, and a corresponding quantum expectation can be a minimal eigenvalue. Subsequent larger eigenpairs can be searched through a meta-level search comprising a deflated eigenvalue objective and/or an inequality bound constraint ensuring that eigenpairs found are larger than eigenpairs previously found. In one example, the inequality bound constraint can be initially set equal to an inactive constraint or can have infinity as lower bound). In certain embodiments, a penalty providing preference to a smallest discoverable eigenvalue can be achieved. In certain embodiments, a meta-level search procedure can be performed until k eigenpairs are identified, where k is an integer. In certain embodiments, the meta-level search can be a mixed computation of a first order moment and a second order moment. The second order moments can be computed by a squared operator implicit formation, by a second moment expectation computation by application of an operator to a state and a corresponding projection to a local measurement basis applied to a squared operator, and/or by a computation that leverages algebraic structures such as, for example Pauli identities to reduce Pauli products to a single Pauli and/or anti-symmetry cancellations. In another embodiment, higher order moments can be computed where expectation of high order operator that are higher than second order moments can be utilized. In certain embodiments, a variational quantum k-eigenvalue decomposition process can be employed.

In yet another embodiment, a quantum processor can compute an expected value of a parameter-dependent deflated operator and a variationally represented quantum state. Samples of a quantum expectation computation can be employed by a k-eigenvalue decomposition process which iteratively determines an inflation parameter and a variational parameterization associated with one or more eigenpairs. A classical processor can perform a meta-level optimization process that determines the variational parametrization of the quantum state and the associated parameter dependent inflation of the operator, that comprises at the optima the eigenvalue and variational representation of the eigenstate of the one or more eigenpairs. In an aspect, a meta-level variational optimization component can send the quantum computer a quantum circuit description. The quantum circuit description can include a trial deflated operator and trial state variational parameterization. The quantum expectation computation can include quantum measurement and can be performed on the quantum processor. Expectation of the quantum measurements output can be computed on a classical processor. The meta-level variational optimization process can utilize the quantum expectation value output functionality in a feedback mechanism to determine iteratively the desired eigenvalue and eigenstate. The meta-level optimization process can determine the eigen-pairs sequentially and can employ information of previously found eigenvalues to constrain the meta-level search to eigenvalues higher (or lower if descending rather than ascending order is pursuit) than the previously found eigenvalues. Additionally or alternatively, the meta-level variational optimization component can determine sequentially k eigenpairs by sending the quantum processor components of the operator. The quantum processor can compute the expectation for each component of the expectation separately, where weights of each operator component is post-multiplied classically. In one embodiment, the operator can be represented as a weighted sum of Pauli and the identity operator, such that, effectively an overhead of a single operator per qubit is required for computation of each expectation component.

In yet another embodiment, meta-level quantum computation of k-eigen decomposition can be provided. A system can comprise a quantum processor that receives in the form of a quantum circuit, components of a deflated operator and a trial state variational representation. The quantum computation corresponds to expectation of the operator with respect to the trial state. The measurements of the quantum computation can be provided to a classical processor that weighs the measurements according to weights of each operator component, and then compute expectation their −1 to the power of their modulo 2 sum. The classical processor can additionally perform a meta-level optimization search for both the eigen-value as well as variational parametrization of the state. The objective of the meta-level optimization incorporates the eigenvalue condition, as well as a monotonic function of the eigenvalues, facilitates search for a smallest eigenvalue. In addition, a lower bound constraint can be imposed upon the eigenvalue parameter to ensure that only eigenvalues larger than those previously found is searched. In this regard, the eigen pairs can be determined sequentially. Since the expectation computation may be performed on a non-fault tolerant quantum processor, the computation of the expectation of a sum of components can be replaced by the sum of multiple expectations of the components. This computation can be performed with a small overhead in terms of quantum circuit depth beyond the trial state representation, which mitigate quantum computation errors.

As such, error (e.g., noise) associated with the quantum processor can be reduced. For example, an amount of noise (e.g., an amount of error) associated with a non-fault tolerant quantum computation can be reduced by virtue of performing multiple short-depth circuit computation. Efficiency of the quantum processor and/or accuracy of the quantum processor can also be improved. Moreover, an amount of time to perform a quantum computation can be reduced. Furthermore, an amount of computational resources employed to compute a quantum computation can be reduced. A quantum computation can also be optimized. Additionally, accuracy of a quantum computation and/or efficiency of a quantum computation can be improved. In addition, quality of a quantum processor can be improved, performance a quantum processor can be improved, timing characteristics of a quantum processor can be improved, power characteristics of a quantum processor can be improved, and/or another characteristic of a quantum processor can be improved.

FIG. 1 illustrates a block diagram of an example, non-limiting system 100 for meta-level quantum computation in accordance with one or more embodiments described herein. In various embodiments, the system 100 can be a quantum processing system associated with technologies such as, but not limited to, quantum processing technologies, quantum circuit technologies, quantum computing design technologies, artificial intelligence technologies, machine learning technologies, search engine technologies, image recognition technologies, speech recognition technologies, model reduction technologies, iterative linear solver technologies, data mining technologies, healthcare technologies, pharmaceutical technologies, biotechnology technologies, finance technologies, chemistry technologies, material discovery technologies, vibration analysis technologies, geological technologies, aviation technologies, and/or other technologies. The system 100 can employ hardware and/or software to solve problems that are highly technical in nature, that are not abstract and that cannot be performed as a set of mental acts by a human. Further, in certain embodiments, some of the processes performed may be performed by one or more specialized computers (e.g., one or more specialized processing units, a specialized computer with a classical processor component, etc.) for carrying out defined tasks related to quantum circuit simulation. The system 100 and/or components of the system 100 can be employed to solve new problems that arise through advancements in technologies mentioned above, computer architecture, quantum processing architecture and/or the like. One or more embodiments of the system 100 can provide technical improvements to quantum processing systems, quantum circuit systems, quantum computing design systems, artificial intelligence systems, machine learning systems, search engine systems, image recognition systems, speech recognition systems, model reduction systems, iterative linear solver systems, data mining systems, healthcare systems, pharmaceutical systems, biotechnology systems, finance systems, chemistry systems, material discovery systems, vibration analysis systems, geological systems, aviation systems, and/or other systems. One or more embodiments of the system 100 can also provide technical improvements to a quantum processor (e.g., a quantum circuit) by improving processing performance of the quantum processor, improving processing efficiency of the quantum processor, improving processing accuracy of the quantum processor, improving timing characteristics of the quantum processor and/or improving power efficiency of the quantum processor.

In the embodiment shown in FIG. 1, the system 100 can include a quantum processor 102 and a classical processor component 104. As shown in FIG. 1, the classical processor component 104 can include an expectation computation component 106 and/or a meta-level variational optimization component 108. In an embodiment, the classical processor component 104 can be implemented without the expectation computation component 106. In another embodiment, the classical processor component 104 can be implemented without the meta-level variational optimization component 108. In yet another embodiment, the classical processor component 104 can be implemented with the expectation computation component 106 and the meta-level variational optimization component 108. Aspects of the classical processor component 104 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the classical processor component 104 can also include memory 110 that stores computer executable components and instructions. Furthermore, the classical processor component 104 can include a processor 112 to facilitate execution of the instructions (e.g., computer executable components and corresponding instructions) by the classical processor component 104. As shown, the expectation computation component 106, the meta-level variational optimization component 108, the memory 110 and/or the processor 112 can be electrically and/or communicatively coupled to one another in one or more embodiments. In an embodiment, the classical processor component 104 can be a classical processor. In another embodiment, the classical processor component 104 can be a component of a classical processor. In yet another embodiment, the classical processor component 104 can be a component in communication with a classical processor. A classical processor as disclosed herein can be a machine that processes data based on binary digits and/or transistors. Furthermore, a quantum processor as disclosed herein can be a machine that processes data based on quantum bits and/or quantum mechanical phenomena associated with superposition and/or entanglement.

The quantum processor 102 and the classical processor component 104 can be employed to provide a hybrid classical computing/quantum computing environment. For instance, the quantum processor 102 and the classical processor component 104 can be employed to perform one or more quantum computations associated with a quantum-variational eigensolver architecture. The quantum processor 102 can be a machine that performs a set of calculations based on principle of quantum physics. For instance, the quantum processor 102 can perform one or more quantum computations associated with a set of quantum gates. Furthermore, the quantum processor 102 can encode information using qubits. In an aspect, the quantum processor 102 can execute a set of instruction threads associated with circuit data 114 and/or circuit data 115. In an embodiment, the quantum processor 102 can employ the circuit data 114 and/or the circuit data 115 during at least a portion of a k-eigenvalue decomposition process to generate quantum measurement data 116. The circuit data 114 can be circuit data for describing a trial eigenstate associated with a quantum circuit description. The circuit data 115 can be circuit data for describing a deflated operator associated with a quantum circuit description. The quantum processor 102 can perform an expectation computation process to compute an expected value of a deflated operator and a quantum state associated with a quantum circuit description. The quantum circuit description can be described by the circuit data 114 and/or the circuit data 115. In an aspect, the quantum processor 102 can factorize the circuit data 114 and/or the circuit data 115 into a mathematical expression represented by a set of eigenvalues and/or a set of eigenvectors. An eigenvector can be a vector that can change by a scalar factor when a linear transformation is applied to the eigenvector. An eigenvalue can be the scalar factor applied to an eigenvector to obtain a linear transformation. The quantum measurement data 116 can be indicative of a set of quantum measurements associated with the circuit data 114 and/or the circuit data 115. In an aspect, the quantum measurement data 116 can include a set of quantum measurements associated with the k-eigenvalue decomposition process. For instance, the quantum measurement data 116 can include a set of samples of the expectation computation process performed by the quantum processor 102. Furthermore, the quantum processor 102 can provide the quantum measurement data 116 to the classical processor component 104.

The classical processor component 104 can be associated with a machine that performs a set of calculations based on binary digits and/or transistors. The classical processor component 104 (e.g., the expectation computation component 106 of the classical processor component 104) can receive the quantum measurement data 116. For instance, the classical processor component 104 can be communicatively coupled to the quantum processor 102. In one example, the classical processor component 104 can be communicatively coupled to the quantum processor 102 via a wired communication channel. In another example, the classical processor component 104 can be communicatively coupled to the quantum processor 102 via a wireless communication channel.

The meta-level variational optimization component 108 can perform a meta-level optimization process associated with another portion of the k-eigenvalue decomposition process to iteratively determine an inflation parameter and a variational parameterization for an eigenpair based on the quantum measurement data 116. For instance, the meta-level variational optimization component 108 can perform a meta-level optimization process associated with another portion of the k-eigenvalue decomposition process to iteratively determine an inflation parameter and a variational parameterization for an eigenpair based on samples of the expectation computation process. In an embodiment, the meta-level variational optimization component 108 can transmit the quantum circuit description to the quantum processor 102. The quantum circuit description can include the circuit data 114 and/or the circuit data 115. For example, the quantum circuit description can include, for example, a trial deflated operator and/or a trial state variational parameterization. In certain embodiments, the quantum circuit description can additionally or alternatively include an operator represented as a weighted sum of tensor products of Pauli and/or identity operators. The quantum processor 102 can perform the expectation computation process to generate the quantum measurement data 116. For instance, the quantum processor 102 can perform the expectation computation process to generate the quantum measurement data 116 indicative of a set of quantum measurements. The expectation computation component 106 can compute an expectation of the quantum measurement data 116. Furthermore, the meta-level variational optimization component 108 can utilize output from the expectation of the quantum measurement data 116 to iteratively determine an eigenvalue and an eigenstate. In an aspect, the meta-level optimization process performed by the meta-level variational optimization component 108 can employ information from previously determined eigenvalues to determine eigenvalues higher than the previously determined eigenvalues.

In certain embodiments, the expectation computation component 106 can generate statistical data based on the quantum measurement data 116. The statistical data can be indicative of an expected value associated with the quantum measurement data 116. For example, the expectation computation component 106 can sample one or more computations from quantum measurements associated with the quantum measurement data 116. Furthermore, the expectation computation component 106 can determine the statistical data based on the expected value of the one or more computations from the quantum measurements associated with the quantum measurement data 116. In another example, the statistical data can be indicative of a mean value associated with the quantum measurement data 116. For example, the expectation computation component 106 can sample one or more computations from quantum measurements associated with the quantum measurement data 116. Furthermore, the expectation computation component 106 can determine the statistical data based on a mean value of the one or more computations from the quantum measurements associated with the quantum measurement data 116. Additionally or alternatively, the statistical data can be indicative of another statistical value associated with the quantum measurement data 116. For example, the expectation computation component 106 can additionally or alternatively determine the statistical data based on one or more other statistical values of the one or more computations from the quantum measurements associated with the quantum measurement data 116. In certain embodiments, the expectation computation component 106 can format the quantum measurement data 116 based on a modulo summation process that employs modular arithmetic associated with a sum of two bits. The meta-level variational optimization component 108 can determine a quantum state based on the quantum measurement data 116. For instance, the meta-level variational optimization component 108 can perform a variational optimization process to facilitate determination of a quantum state based on the quantum measurement data 116. In an embodiment, the meta-level variational optimization component 108 can determine a quantum state based on the statistical data. In one example, the quantum state can include, for example, a set of quantum bits (e.g., a set of qubits). In another example, the quantum state can include information associated with an x-component measurement, a y-component measurement and/or a z-component measurement associated with a state of a quantum bit associated with the quantum processor. In an aspect, the meta-level variational optimization component 108 can determine a quantum state preparation based on the quantum measurement data 116. Additionally or alternatively, the meta-level variational optimization component 108 can determine an eigen-pair value based on the quantum measurement data 116 and/or the statistical data. For instance, additionally or alternatively, the meta-level variational optimization component 108 can determine an eigenvalue and/or associated variational description of a preparation of an eigen state based on the quantum measurement data 116. In an aspect, the meta-level variational optimization component 108 can generate circuit data 118 that describes a trial eigenstate based on a variational parameterization. Additionally or alternatively, the meta-level variational optimization component 108 can generate circuit data 119 that describes a deflated operator based on an eigenvalue.

In certain embodiments, the expectation computation component 106 and/or the meta-level variational optimization component 108 can generate the circuit data 118 and/or the circuit data 119 based on classifications, correlations, inferences and/or expressions associated with principles of artificial intelligence. For instance, the expectation computation component 106 and/or the meta-level variational optimization component 108 can employ an automatic classification system and/or an automatic classification process to generate the circuit data 118 and/or the circuit data 119. In one example, the expectation computation component 106 and/or the meta-level variational optimization component 108 can employ a probabilistic and/or statistical-based analysis (e.g., factoring into the analysis utilities and costs) to learn and/or generate inferences with respect to the quantum measurement data 116. In an aspect, the expectation computation component 106 and/or the meta-level variational optimization component 108 can include an inference component (not shown) that can further enhance aspects of the expectation computation component 106 and/or the meta-level variational optimization component 108 utilizing in part inference based schemes to facilitate learning and/or generating inferences associated with the quantum measurement data 116. The expectation computation component 106 and/or the meta-level variational optimization component 108 can employ any suitable machine-learning based techniques, statistical-based techniques and/or probabilistic-based techniques. For example, the expectation computation component 106 and/or the meta-level variational optimization component 108 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the expectation computation component 106 and/or the meta-level variational optimization component 108 can perform a set of machine learning computations associated with generation of the circuit data 118 and/or the circuit data 119. For example, the expectation computation component 106 and/or the meta-level variational optimization component 108 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to generate the circuit data 118 and/or the circuit data 119.

It is to be appreciated that the quantum processor 102 and/or the classical processor component 104 (e.g., the expectation computation component 106 and/or the meta-level variational optimization component 108) performs one or more quantum computation processes that cannot be performed by a human (e.g., is greater than the capability of a single human mind). For example, an amount of data processed, a speed of data processed and/or data types of data processed by the quantum processor 102 and/or the classical processor component 104 (e.g., the expectation computation component 106 and/or the meta-level variational optimization component 108) over a certain period of time can be greater, faster and different than an amount, speed and data type that can be processed by a single human mind over the same period of time. The quantum processor 102 and/or the classical processor component 104 (e.g., the expectation computation component 106 and/or the meta-level variational optimization component 108) can also be fully operational towards performing one or more other functions (e.g., fully powered on, fully executed, etc.) while also performing the above-referenced quantum circuit decomposition process and/or one or more simulation processes. Moreover, the quantum measurement data 116, the circuit data 118 and/or the circuit data 119 generated by the quantum processor 102 and/or the classical processor component 104 (e.g., the expectation computation component 106 and/or the meta-level variational optimization component 108) can include information that is impossible to obtain manually by a user. For example, a type of information included in the quantum measurement data 116, the circuit data 118 and/or the circuit data 119, and/or a variety of information included in the quantum measurement data 116, the circuit data 118 and/or the circuit data 119 can be more complex than information obtained manually by a user.

Additionally, it is to be appreciated that the system 100 can provide various advantages as compared to conventional quantum computation techniques. For instance, an amount of time to perform a quantum computation process can be reduced by employing the system 100. Furthermore, an amount of computational resources employed to perform a quantum computation process can be reduced by employing the system 100. Accuracy of a quantum computation can also be improved by employing the system 100. Additionally, an amount of error and/or noise associated with a quantum computation can be reduced by employing the system 100. Additionally, an amount of error and/or noise associated with a quantum processor can be reduced by employing the system 100. Moreover, quality of a quantum processor can be improved, performance a quantum processor can be improved, efficiency of a quantum processor can be improved, timing characteristics of a quantum processor can be improved, power characteristics of a quantum processor can be improved, and/or another characteristic of a quantum processor can be improved by employing the system 100.

Figure 2:
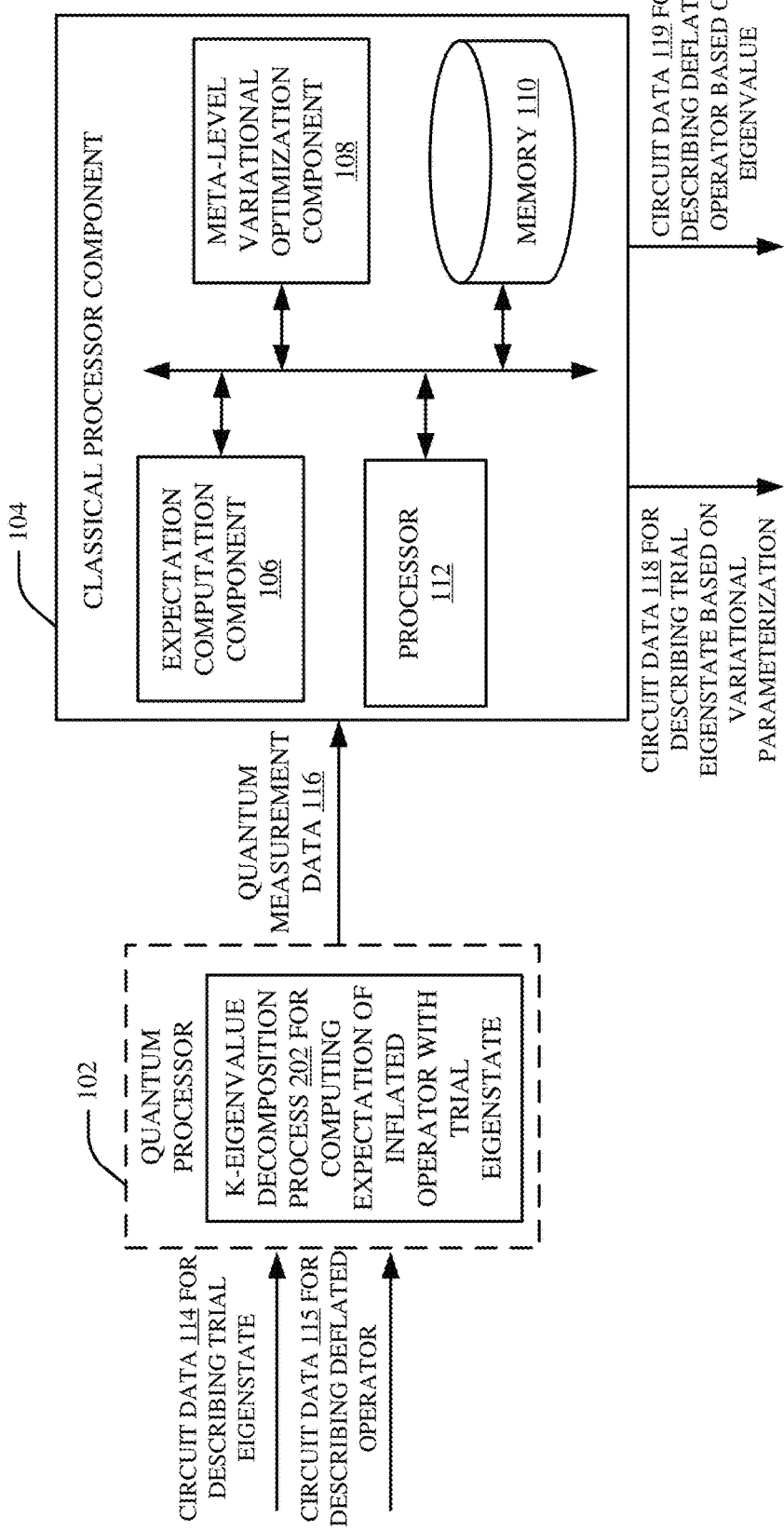
FIG. 2 illustrates a block diagram of another example, non-limiting system that includes a quantum processor and a classical processor component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the quantum processor 102 and the classical processor component 104. The classical processor component 104 can include the expectation computation component 106, the meta-level variational optimization component 108, the memory 110 and/or the processor 112. The quantum processor 102 shown in FIG. 2 can execute a k-eigenvalue decomposition process 202. The quantum processor 102 can employ the k-eigenvalue decomposition process 202 to generate the quantum measurement data 116. In an aspect, the k-eigenvalue decomposition process 202 can compute expectation of a deflated operator with a trial eigenstate. For example, the k-eigenvalue decomposition process 202 can include trial state preparation and/or an expectation realization process to compute expectation of a deflated operator with a trial eigenstate. In one example, the k-eigenvalue decomposition process 202 can generate a set of quantum measurements associated with the circuit data 114 and/or the circuit data 115.

Additionally, it is to be appreciated that the system 200 can provide various advantages as compared to conventional quantum computation techniques. For instance, an amount of time to perform a quantum computation process can be reduced by employing the system 200. Furthermore, an amount of computational resources employed to perform a quantum computation process can be reduced by employing the system 200. Accuracy of a quantum computation can also be improved by employing the system 200. Additionally, an amount of error and/or noise associated with a quantum computation can be reduced by employing the system 200. Additionally, an amount of error and/or noise associated with a quantum processor can be reduced by employing the system 200. Moreover, quality of a quantum processor can be improved, performance a quantum processor can be improved, efficiency of a quantum processor can be improved, timing characteristics of a quantum processor can be improved, power characteristics of a quantum processor can be improved, and/or another characteristic of a quantum processor can be improved by employing the system 200.

Figure 3:
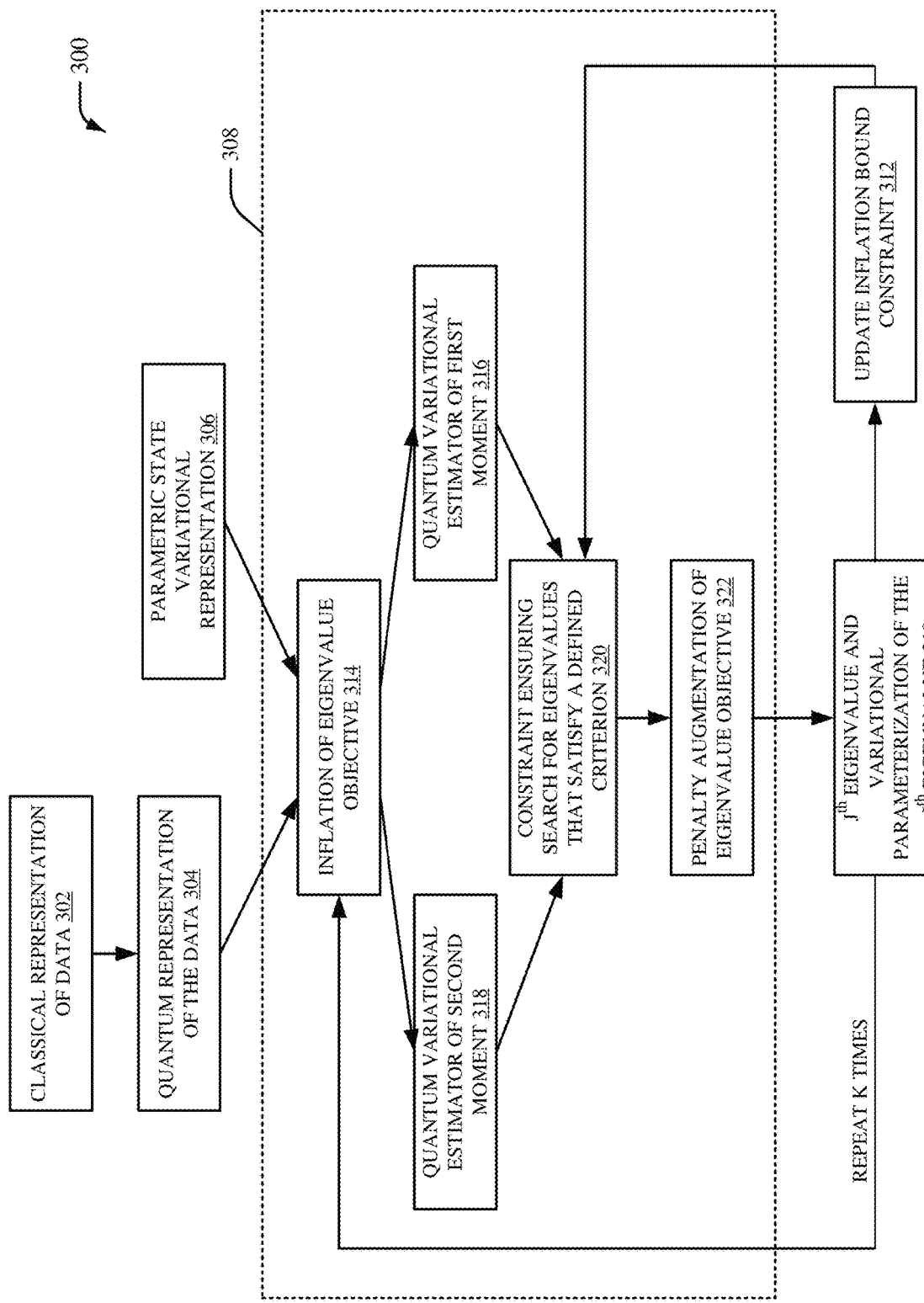
FIG. 3 illustrates an example, non-limiting system associated with k-eigenvalue decomposition in accordance with one or more embodiments described herein.

FIG. 3 illustrates an example, non-limiting system 300 in accordance with one or more embodiments described herein. Repetitive description of like elements employed in other embodiments described herein is omitted for sake of brevity.

The system 300 can illustrate a k-eigenvalue decomposition process. A classical representation of data (e.g., an operator) can be provided at step 302 of the k-eigenvalue decomposition process. At step 304 of the k-eigenvalue decomposition process, quantum representation can be generated. At step 306 of the k-eigenvalue decomposition process, a parametric state variational representation of the data can be provided. The quantum representation of the data and the parametric state variational representation of the data can be provided to a meta level search process 308. The meta level search process 308 can generate a $J^{th}$ eigenvalue and a variational parameterization of the $J^{th}$ eigenvalue at step 310, where J is an integer. At step 312 of the k-eigenvalue decomposition process, an inflation bound constraint can be updated. The meta level search process 308 of the k-eigenvalue decomposition process can determine an inflation of an eigenvalue objective at step 314. For example, the meta level search process 308 can determine an inflation of an eigenvalue objective based on the quantum representation of the data and/or the parametric state variational representation. The inflation of the eigenvalue objective can be represented by the following equation: $\|(H-\lambda I)|\psi(\theta)\rangle\|^2$. At step 316 of the meta level search process 308, a quantum variational estimator of first moment can be determined. The quantum variational estimator of the first moment can be represented by the following equation: $\langle\psi(\theta)|H^2|\psi(\theta)\rangle$. At step 318 of the meta level search process 308, a quantum variational estimator of second moment can be determined. The quantum variational estimator of the second moment can be represented by the following equation: $\langle\psi(\theta)|H^2|\psi(\theta)\rangle$. At step 320 of the meta level search process 308, a constrain ensuring search for eigenvalues that satisfy a defined criterion can be performed. For example, a constrain ensuring search for eigenvalues that are larger than previously discovered eigenvalues can be determined. At step 322 of the meta level search process 308, penalty augmentation of the eigenvalue objective can be performed. The penalty augmentation of the eigenvalue objective can be represented by the following equation: $\langle\psi(\theta)|H^2-2\lambda H+\lambda^2 I|\psi(\theta)\rangle+\alpha f(\lambda)$. In certain embodiments, the meta level search process 308 can be repeated a defined number of times (e.g., repeated K times where K is an integer).

In certain embodiments, the meta level search process 308 can be employed to estimate one or more additional eigen-pairs (e.g., additional to an eigen-pair corresponding to a smallest eigenvalue). In an embodiment, the meta level search process 308 can be performed where an eigen-value condition corresponds to:

$$\mathcal{H}|\psi(\theta)\rangle=\lambda|\psi(\theta)\rangle \Leftrightarrow \mathcal{H}|\psi(\theta)\rangle-\lambda|\psi(\theta)\rangle=0$$

In an embodiment, an optimization process associated with the meta level search process 308 can correspond to:

$$\min_{\lambda,\theta} \|(\mathcal{H}-\lambda I\,|\psi(\theta)\rangle\| \quad \min_{\lambda,\theta} \langle\psi(\theta)|(\mathcal{H}-\lambda I)^\dagger(\mathcal{H}-\lambda I)|\psi(\theta)\rangle$$

$$\text{s.t. } \lambda \neq \{\hat{\lambda}_i\} \Leftrightarrow \text{s.t. } \lambda \neq \{\hat{\lambda}_i\}$$

In another embodiment, to extract a smallest eigen-pairs orderly, the following meta-level optimization process associated with the meta level search process 308 performed iteratively:

$$\min_{\lambda,\theta} \langle\psi(\theta)|\mathcal{H}^2 - 2\lambda\mathcal{H} + \lambda^2 I|\psi(\theta)\rangle + \alpha f(\lambda)$$

$$\text{s.t. } \lambda \geq \{\hat{\lambda}_i\}\; \alpha \geq 0$$

where f can be a monotonically increasing function with respect to $\lambda$.

Figure 4:
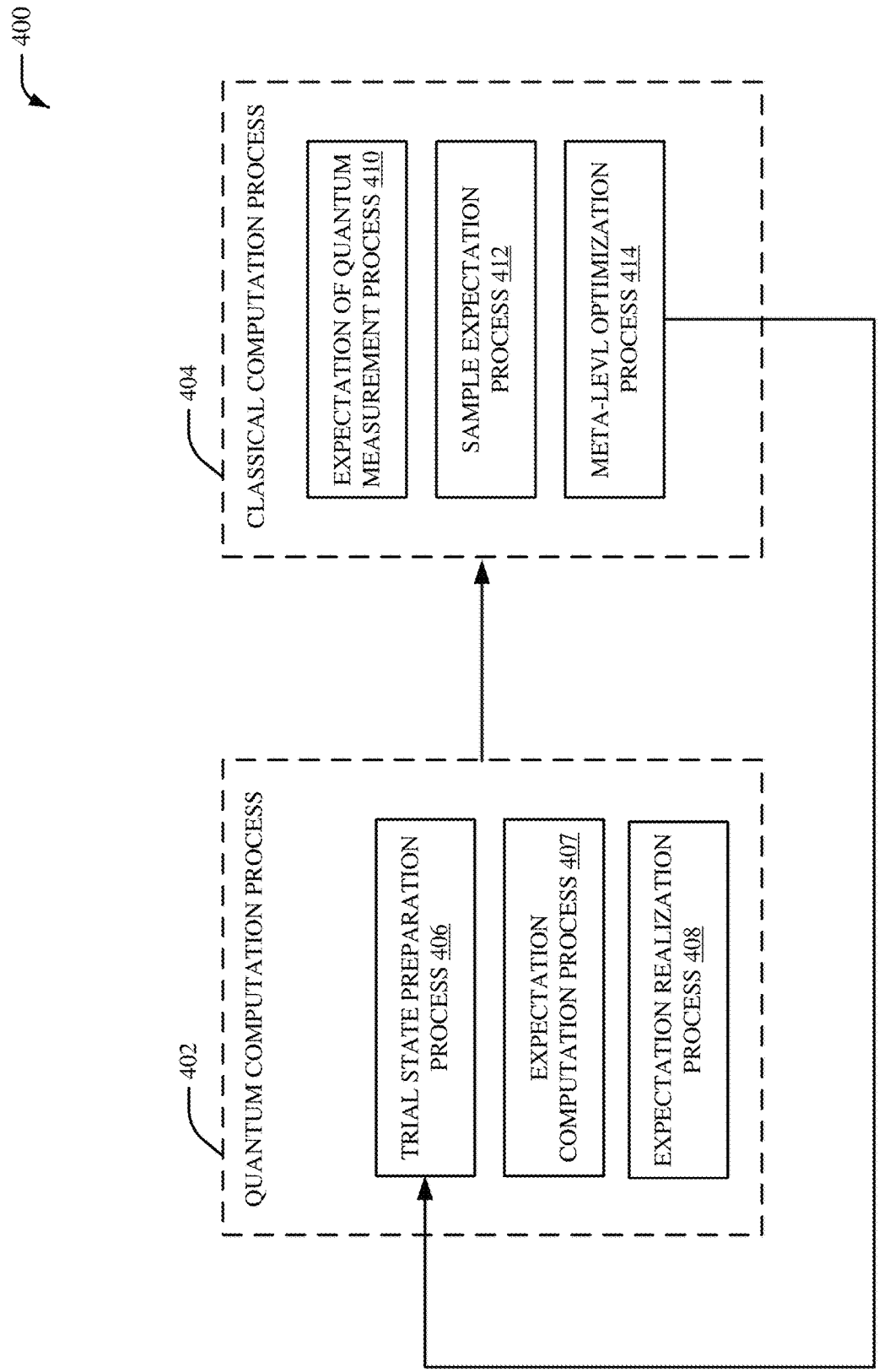
FIG. 4 illustrates an example, non-limiting system associated with a quantum computation process and a classical computation process in accordance with one or more embodiments described herein.

FIG. 4 illustrates an example, non-limiting system 400 in accordance with one or more embodiments described herein.

Repetitive description of like elements employed in other embodiments described herein is omitted for sake of brevity.

The system 400 can include a quantum computation process 402 and a classical computation process 404. The quantum computation process 402 can be executed by a quantum processor and the classical computation process can be performed by a classical processor. In an aspect, the quantum computation process 402 can be associated with the quantum processor 102 and the classical computation process 404 can be associated with the classical processor component 104. The quantum computation process 402 can include a trial state preparation process 406, an expectation computation process 407 and/or an expectation realization process 408. The trial state preparation process 406 can provide a set of gates to load onto a quantum processor (e.g., the quantum processor 102). The trial state preparation process 406 can also enable a quantum processor (e.g., the quantum processor 102) with one or more trial states tailored for a set of interactions associated with the quantum processor (e.g., the quantum processor 102). In a non-limiting example, the trial state preparation process 406 can be characterized by the following equation:

$$|\psi(\theta^{(k)})\rangle$$

The expectation computation process 407 can compute an expected value of a deflated operator and a quantum state associated with a quantum circuit description. The expectation realization process 408 can perform at least a portion of a k-eigenvalue decomposition process (e.g., the k-eigenvalue decomposition process 202). In an aspect, the expectation realization process 408 can determine a set of expectation values for terms in a qubit Hamiltonian. Additionally or alternatively, the expectation realization process 408 can estimate energy of a trial state associated with the trial state preparation process 406. In one example, the expectation realization process 408 can estimate energy of a trial state associated with the trial state preparation process 406 by measuring a set of expectation values of a set of Pauli terms in the Hamiltonian. In a non-limiting example, the expectation realization process 408 can be characterized by the following equation:

$$\langle\psi(\theta^{(k)})|\mathcal{H}\gamma|\psi(\theta^{(k)})\rangle$$

The classical computation process 404 can be performed based on the quantum computation process 402. For example, the classical computation process 404 can be performed based on quantum measurement data (e.g., the quantum measurement data 116) associated with the quantum computation process 402. The classical computation process 404 can include an expectation of quantum measurement process 410, a sample expectation process 412 and/or a meta-level optimization process 414. The expectation of quantum measurement process 410 can format data provided by the quantum computation process 402. For instance, the expectation of quantum measurement process 410 can format quantum measurement data (e.g., the quantum measurement data 116) associated with the quantum computation process 402. In one example, the expectation of quantum measurement process 410 can format data provided by the quantum computation process 402 based on a modulo summation process. In one example, the modulo summation process can be a modulo 2 summation process. The sample expectation process 412 can generate statistical data associated with data provided by the quantum computation process 402. For example, the sample expectation process 412 can generate statistical data associated with quantum measurement data (e.g., the quantum measurement data 116) determined by the quantum computation process 402. In an embodiment, the sample expectation process 412 can generate expectation data indicative of one or more expected values associated with data provided by the quantum computation process 402. In another embodiment, the sample expectation process 412 can generate mean data indicative of one or more mean values associated with data provided by the quantum computation process 402. The meta-level optimization process 414 can optimize data provided by the quantum computation process 402 to determine variational parametrization associated with the data. In an embodiment, the meta-level optimization process 414 can employ one or more derivative free optimization techniques, a template based pattern search, derivative based optimization, mixed integer non-linear programming and/or another technique to optimize data provided by the quantum computation process 402. In one example, the quantum computation process 402 can determine a cost function associated with the quantum processor (e.g., the quantum processor 102). The cost function can be associated with energy associated with the quantum processor (e.g., the quantum processor 102), for example. Furthermore, based on the cost function, the quantum computation process 402 can adjust a set of variational parameters. In an embodiment, the set of variational parameters can be provided to the trial state preparation process 406 as feedback data to reduce the cost function associated with the quantum processor (e.g., the quantum processor 102).

FIG. 5 illustrates example, non-limiting data 500 in accordance with one or more embodiments described herein. Repetitive description of like elements employed in other embodiments described herein is omitted for sake of brevity.

The data 500 can be, for example, data employed by a classical processor. For instance, the data 500 can be converted into a different data format (e.g., a weighted sum of products of Pauli operators) that is provided to a quantum processor (e.g., quantum processor 102). In one example, the data 500 can be data provided to a quantum processor (e.g., quantum processor 102) after being transformed into a suitable format for processing by the quantum processor. In an embodiment, the data 500 can be formatted as a data matrix. For example, the data 500 can be formatted as an 8×8 data matrix. In another embodiment, the data 500 can be formatted as a weighted sum of products of Pauli operators that start from an initial data matrix description. The data 500 can be associated with a quantum system that performs one or more quantum computations. In an aspect, the data 500 can be associated with a quantum processing system, a quantum circuit system, a quantum computing design system, an artificial intelligence system, a machine learning system, a search engine system, an image recognition system, a speech recognition system, a model reduction system, an iterative linear solver system, a data mining system, a healthcare system, a pharmaceutical system, a biotechnology system, a finance system, a chemistry system, a material discovery system, a vibration analysis system, a geological system, an aviation system and/or another system. In an embodiment, the data 500 can be processed by a k-eigenvalue decomposition process (e.g., the k-eigenvalue decomposition process 202). In an embodiment, an eigenvalue of the data 500 can be determined with three qubits associated with a quantum processor (e.g., the quantum processor 102) since the data 500 is an 8 by 8 matrix and $\log_2 8=3$.

Figure 6:
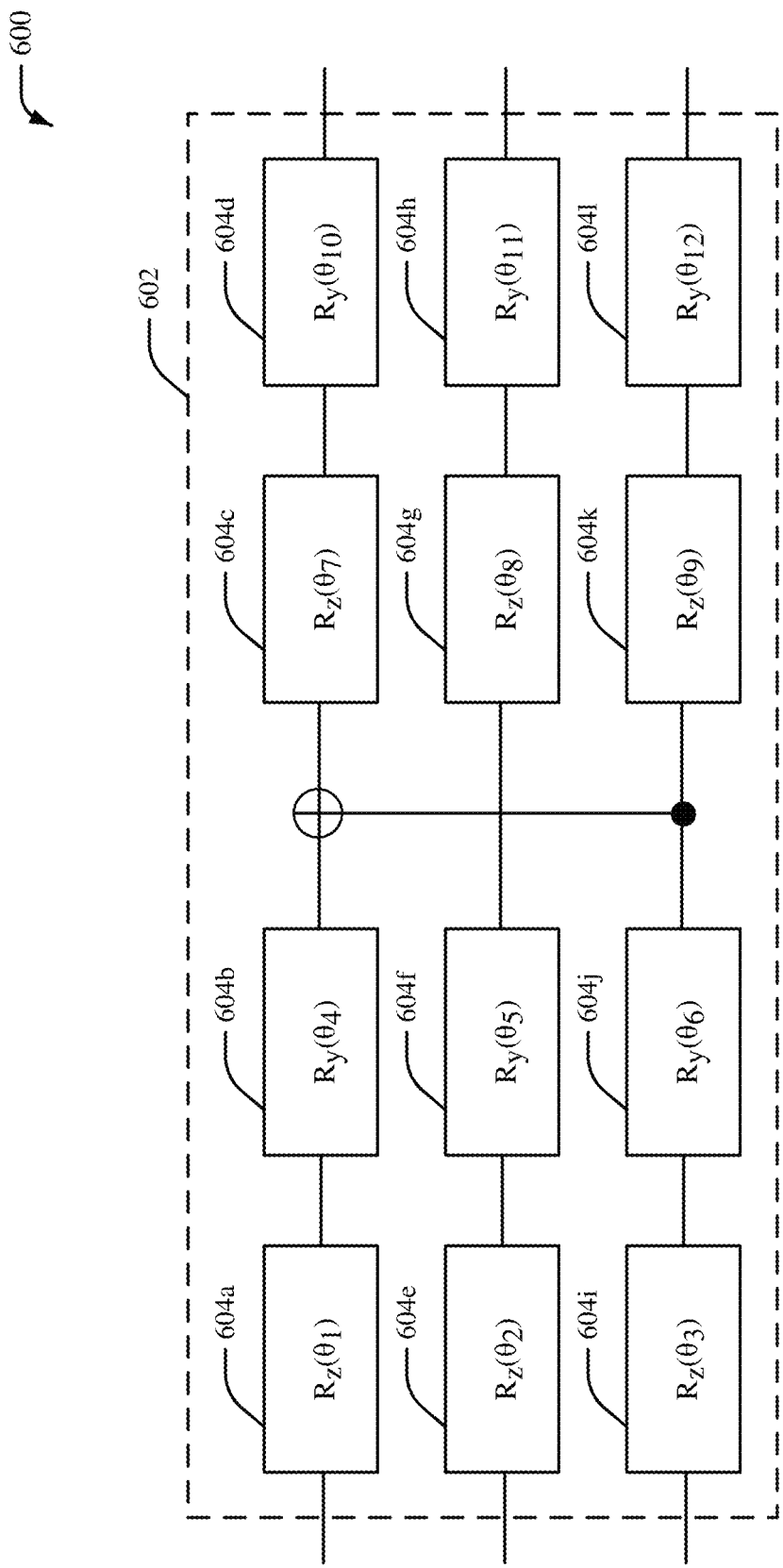
FIG. 6 illustrates an example, non-limiting system associated with a quantum circuit in accordance with one or more embodiments described herein.

FIG. 6 illustrates an example, non-limiting system 600 in accordance with one or more embodiments described herein. Repetitive description of like elements employed in other embodiments described herein is omitted for sake of brevity.

The system 600 can include a quantum circuit 602. In an aspect, the data 500 can be expressed as a weighted summation of products of Pauli operators such that $H=0.5I\otimes I\otimes I-1I\otimes X\otimes I+0.5Z\otimes I\otimes Z+1Z\otimes X\otimes Z-1X\otimes I\otimes X+0.5X\otimes X\otimes X-1Y\otimes I\otimes Y-0.5Y\otimes X\otimes Y$, where H represents the data 500. Furthermore, a space of variational forms associated with H can correspond to the quantum circuit 602. The quantum circuit 602 can include a set of qubit gates 604a-l. In this example, the set of qubit gates 604a-d can be applied to a first qubit, the qubit gates 604e-h can correspond be applied to a second qubit, and the qubit gates 604i-l can be applied to a third qubit.

Figure 7:
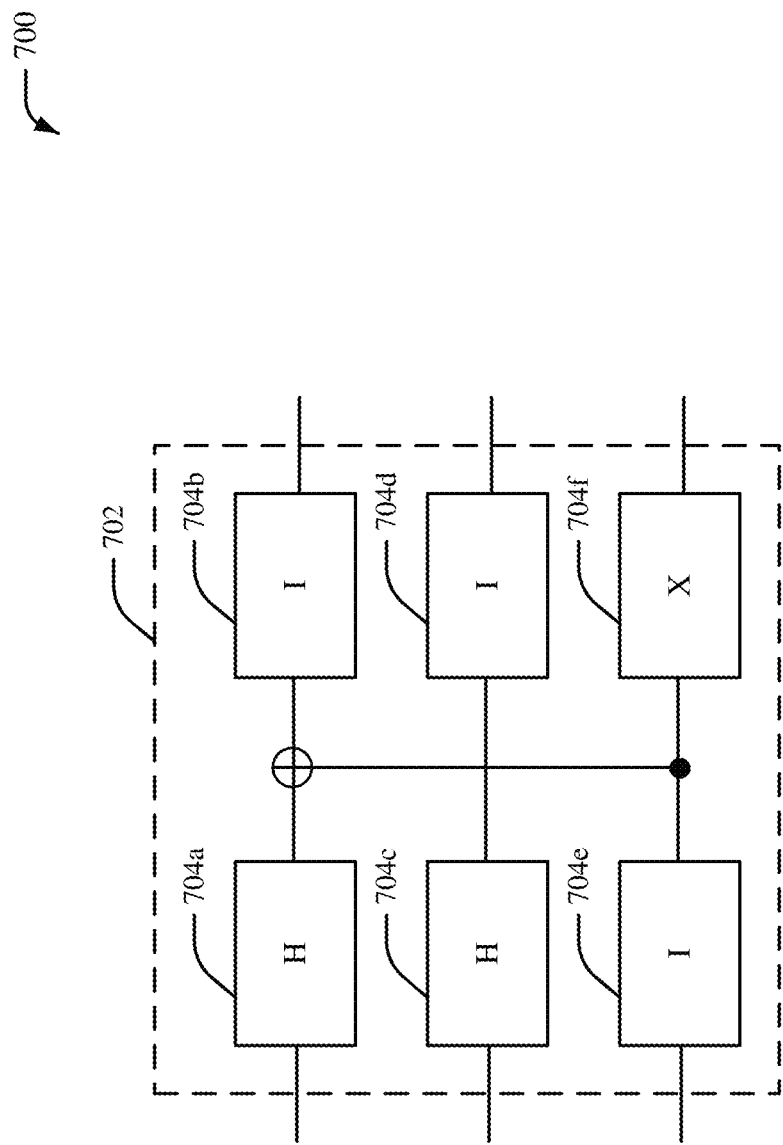
FIG. 7 illustrates another example, non-limiting system associated with a quantum circuit in accordance with one or more embodiments described herein.

FIG. 7 illustrates an example, non-limiting system 700 in accordance with one or more embodiments described herein. Repetitive description of like elements employed in other embodiments described herein is omitted for sake of brevity.

The system 700 can include a quantum circuit 702. The quantum circuit 702 can correspond to a particular instantiation of the quantum circuit 602. The quantum circuit 702 can include a set of qubit gates 704a-f. For example, the qubit gate 704a can be a Hadamard gate that acts on a single qubit, the qubit gate 704b can be an Identity (e.g., idle) gate that acts on a single qubit, the qubit gate 704c can be a Hadamard gate that acts on a single qubit, the qubit gate 704d can be an Identity gate that acts on a single qubit, the qubit gate 702e can be an Identity gate that acts on a single qubit, and the qubit gate 702f can be a Pauli-X gate that acts on a single qubit and is equivalent to a NOT gate. In this example, the quantum circuit 702 can compute a quantum state corresponding to a vector $(0,1/2,0,1/2,1/2,0,1/2,0)^T$, that is an eigenstate of H (e.g., data 500) with an eigenvalue equal to −4. Furthermore, −4 is a smallest eigenvalue of H.

Moreover, because at least generating statistical data associated with quantum measurement data, determining a quantum state associated with data, etc. are established from a combination of electrical and mechanical components and circuitry, a human is unable to replicate or perform processing performed by the classical processor component 104 (e.g., the expectation computation component 106 and/or the meta-level variational optimization component 108) disclosed herein. For example, a human is unable to determine a quantum data for data associated with a quantum processor, etc.

Figure 8:
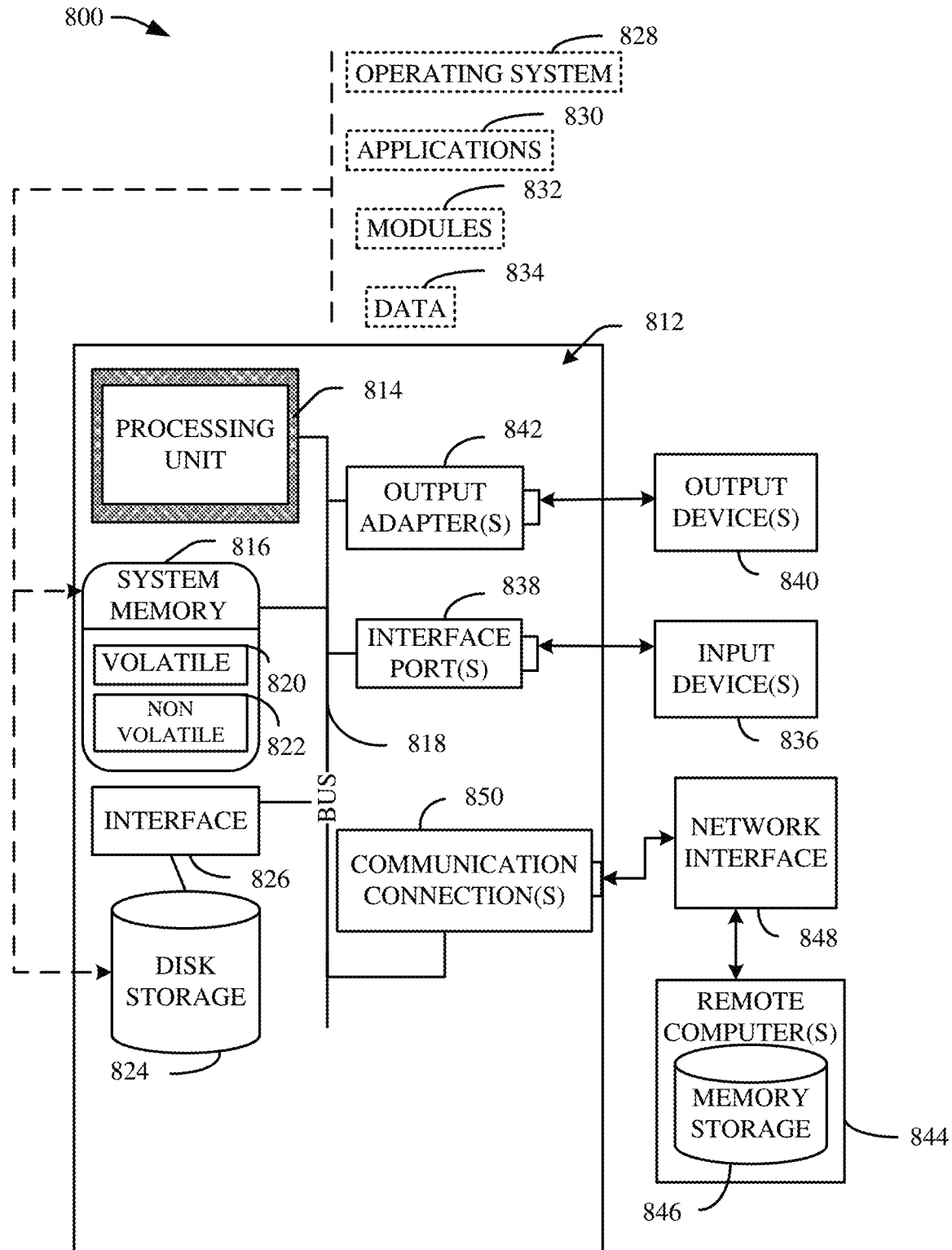
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection (s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a quantum processor that performs an expectation computation process to compute an expected value of a deflated operator and a quantum state associated with a quantum circuit description; and
    a classical processor that executes computer executable components stored in a memory, wherein the computer executable components comprise:
       a meta-level variational optimization component that iteratively performs a meta-level optimization process associated with a k-eigenvalue decomposition process to iteratively determine an inflation parameter and a variational parameterization for an eigenpair based on samples of the expectation computation process, wherein respective iterations of the meta-level optimization process enforce a constraint that an eigenvalue of the eigenpair is greater than previous eigenvalues of previous eigenpairs of previous iterations of the meta-level optimization process.

2. The system of claim 1, wherein the meta-level variational optimization component transmits the quantum circuit description to the quantum processor, and wherein the quantum circuit description includes a trial deflated operator and a trial state variational parameterization.

3. The system of claim 2, wherein the quantum processor performs the expectation computation process to generate quantum measurement data indicative of a set of quantum measurements.

4. The system of claim 3, wherein the computer executable components further comprise:
an expectation computation component that computes an expectation of the quantum measurement data.

5. The system of claim 4, wherein the meta-level variational optimization component utilizes output from the expectation of the quantum measurement data to iteratively determine the eigenvalue and an eigenstate.

6. The system of claim 1, wherein the respective iterations of the meta-level optimization process employ a penalty that provides a preference to a smallest discoverable eigenvalue.

7. The system of claim 4, wherein the expectation computation component formats the quantum measurement data based on a modulo summation process.

8. The system of claim 1, wherein the meta-level variational optimization component transmits the quantum circuit description to the quantum processor, and wherein the quantum circuit description includes an operator represented as a weighted sum of tensor products of Pauli and identity operators.

9. The system of claim 1, wherein the meta-level variational optimization component performs the meta-level optimization process to facilitate reduced error associated with the quantum processor.

10. A computer-implemented method, comprising:
    receiving, by a system operatively coupled to a processor, from a quantum processor, samples of an expectation computation process performed by the quantum processor to compute an expected value of a deflated operator and a quantum state associated with a quantum circuit description; and
    iteratively performing, by the system, a meta-level optimization process associated with a k-eigenvalue decomposition process to iteratively determine an inflation parameter and a variational parameterization for an eigenpair based on samples of the expectation computation process, wherein respective iterations of the meta-level optimization process enforces a constraint that an eigenvalue of the eigenpair is greater than previous eigenvalues of previous eigenpairs of previous iterations of the meta-level optimization process.

11. The computer-implemented method of claim 10, further comprising:
    transmitting, by the system, the quantum circuit description to the quantum processor, wherein the quantum circuit description includes a trial deflated operator and a trial state variational parameterization.

12. The computer-implemented method of claim 11, wherein the performing the meta-level optimization process comprises performing the expectation computation process to generate quantum measurement data indicative of a set of quantum measurement.

13. The computer-implemented method of claim 12, further comprising:
    computing, by the system, an expectation of the quantum measurement data.

14. The computer-implemented method of claim 13, further comprising:
    utilizing, by the system, output from the expectation of the quantum measurement data to iteratively determine the eigenvalue and an eigenstate.

15. The computer-implemented method of claim 10, wherein the performing the meta-level optimization process comprises reducing error associated with the quantum processor.

16. A computer program product for meta-level quantum computation, the computer program product comprising a computer readable storage medium having program instructions embodied therewith, the program instructions executable by a processor to cause the processor to:

receive, by the processor, from a quantum processor, samples of an expectation computation process performed by the quantum processor to compute an expected value of a deflated operator and a quantum state associated with a quantum circuit description; and iteratively perform, by the processor, a meta-level optimization process associated with a k-eigenvalue decomposition process to determine an inflation parameter and a variational parameterization for an eigenpair based on samples of the expectation computation process, wherein respective iterations of the meta-level optimization process enforces a constraint that an eigenvalue of the eigenpair is greater than previous eigenvalues of previous eigenpairs of previous iterations of the meta-level optimization process.

17. The computer program product of claim 16, wherein the program instructions are further executable by the processor to cause the processor to:

transmit, by the processor, the quantum circuit description to the quantum processor, wherein the quantum circuit description includes a trial deflated operator and a trial state variational parameterization.

18. The computer program product of claim 17, wherein the program instructions are further executable by the processor to cause the processor to:

perform, by the processor, the expectation computation process to generate quantum measurement data indicative of a set of quantum measurement.

19. The computer program product of claim 18, wherein the program instructions are further executable by the processor to cause the processor to:

compute, by the system, an expectation of the quantum measurement data.

20. The computer program product of claim 18, wherein the program instructions are further executable by the processor to cause the processor to:

format, by the processor, the quantum measurement data based on a modulo summation process.

* * * * *